(12) United States Patent
Segel

(10) Patent No.: US 7,724,660 B2
(45) Date of Patent: May 25, 2010

(54) COMMUNICATION TRAFFIC CONGESTION MANAGEMENT SYSTEMS AND METHODS

(75) Inventor: Jonathan Dean Segel, Ottawa (CA)

(73) Assignee: Alcatel Lucent, Paris (FR)

(*) Notice: Subject to any disclaimer, the term of this patent is extended or adjusted under 35 U.S.C. 154(b) by 1028 days.

(21) Appl. No.: 11/301,714

(22) Filed: Dec. 13, 2005

(65) Prior Publication Data

US 2007/0133419 A1    Jun. 14, 2007

(51) Int. Cl.
*H04J 1/00* (2006.01)
(52) U.S. Cl. .................. 370/230.1; 370/235
(58) Field of Classification Search ......... 370/230–236, 370/412–418, 236.1
See application file for complete search history.

(56) References Cited

U.S. PATENT DOCUMENTS

| | | | |
|---|---|---|---|
| 6,430,154 B1 * | 8/2002 | Hunt et al. | 370/230.1 |
| 6,490,251 B2 * | 12/2002 | Yin et al. | 370/236.1 |
| 6,917,585 B1 * | 7/2005 | Firoiu et al. | 370/229 |
| 2001/0055313 A1 | 12/2001 | Yin et al. | |

FOREIGN PATENT DOCUMENTS

EP    1 096 737 A2    5/2001

OTHER PUBLICATIONS

Dong Lin et al., "Dynamics of Random Early Detection", Computer Communication Review, Sep. 18, 1997, pp. 127-137, vol. 27, No. 4, ACM, New York, US.
Rupinder Makkar et al., "Empirical Study of Buffer Management Scheme for Diffserv Assured Forwarding PHB", Proceedings of the Ninth International Conference on Computer Communications and Networks, Oct. 2000, US.

* cited by examiner

*Primary Examiner*—Jason E Mattis
*Assistant Examiner*—Dady Chery
(74) *Attorney, Agent, or Firm*—Kirk D. Houser; Eckert Seamans Cherin & Mellott, LLC

(57) ABSTRACT

Communication traffic congestion management systems and methods are disclosed. Communication traffic is analyzed to determine its type, and a traffic congestion management function to be applied to the received communication traffic is selected based on the determined type and a level of communication traffic congestion. Congestion levels may be determined from congestion feedback signals provided by downstream communication components to which a traffic flow controller outputs communication traffic. A traffic congestion management function may be selected and applied on a packet-by-packet or other block-specific basis, or to an entire stream of communication traffic.

16 Claims, 6 Drawing Sheets

COMMUNICATION TRAFFIC CONGESTION MANAGEMENT SYSTEMS AND METHODS

FIELD OF THE INVENTION

This invention relates generally to communications and, in particular, to handling communication traffic congestion.

BACKGROUND

A standard mechanism in Internet Protocol (IP) networks for dealing with congestion is Random Early Discard (RED), sometimes also known as Random Early Detection. When a router sees an impending problem condition, it starts randomly throwing away packets. A Transmission Control Protocol (TCP) protocol client, which would be aware of any packet loss, concludes from observed loss that it is sending packets too quickly, and throttles back its sending rate to thereby alleviate congestion.

In general, the actual packet loss observed by a TCP client is a result of packets being dropped at a receiving device, namely a router in the above example. According to a simple discard mechanism, when the depth of packets in a traffic queue at the receiving device exceeds a discard threshold, packets arriving at that queue are dropped 'off the tail' of the queue until the queue depth recedes below the discard threshold. One problem with this procedure, in the case of TCP connections, is that packets can tend to be dropped from a single TCP connection, resulting in an unfair service impact between customers.

RED can address this problem for TCP connections by using queue depth to determine whether to keep or discard each packet as it arrives at a queue. A packet discard probability, which is dependent on the average depth of the queue over some time period, is compared to a random number. The packet is discarded if its discard probability exceeds the random number. Discard probabilities may be determined using a discard probability function, which might remain at zero until a minimum threshold is reached, increase linearly until a maximum threshold is reached, and remain at 100% for average queue depths greater than the maximum threshold.

In so-called weighted RED, there are multiple discard probability functions, each of which results in a different discard probability for the same average queue depth. The particular discard probability function that is used for a packet depends on the drop precedence of the packet, which is determined by examining the DiffServ Code Point (DSCP) field in the IP header of the packet. Packets that exceed agreements on their connections have their drop precedence and thus their discard probability function changed by an IP policing procedure. As with RED, the determination to keep or discard a packet is made by comparing the discard probability of the packet to a random number. A variation of this procedure uses different probability curves in accordance with a class of service (CoS) of a packet. The CoS of a packet is also determined by examining the DSCP field in the IP header.

One of the limitations of standard or weighted RED is that these techniques are used only on TCP flows. As non-TCP applications such as streaming video, VoIP, and IP video-telephony increase in popularity, the effectiveness of RED decreases because it operates only on the TCP portion of traffic.

This also creates issues with respect to ensuring fairness between users. In a mixed traffic scenario, RED may either discard all packet types, which means that it is degrading the quality of non-TCP traffic types to no useful effect, or it can discard only TCP traffic. In the latter case, it effectively treats all User Datagram Protocol (UDP) and other protocols that do not verify successful delivery as high priority and all TCP applications as low priority. This might not reflect the priorities that a service provider would prefer, since in this case radio-over-the-Internet streaming audio might have a higher priority than business-critical client server applications, for instance.

Intelligent Deep Packet Inspection (DPI) engines are being developed which are capable of looking inside a stream of traffic (beyond the header of each packet) to detect what kind of traffic is flowing in a network. These engines can distinguish between web browsing, email, VoIP, gaming, peer-to-peer, and other application types, for example. However, DPI is not currently used for dealing with traffic congestion.

There remains a need for improved communication traffic congestion management techniques.

SUMMARY OF THE INVENTION

As noted above, randomly discarding data packets to respond to traffic congestion can adversely affect some communication traffic types, such as traffic associated with different applications, more than others. Therefore, techniques for intelligently discarding data packets or flows in order to manage traffic congestion would be useful.

Embodiments of the invention combine the concepts of RED and type- or application-sensitive traffic flow treatment to minimize the effect of discarding packets on certain types of applications. For example, data packets from peer-to-peer and file transfer traffic might be discarded initially. With increasing traffic congestion, data packets from other applications such as web browsing or gaming, which are more sensitive to packet loss, could then be discarded only as needed to control congestion. A discard mechanism that is aware of traffic types also offers the opportunity to discard entire traffic streams as opposed to packets. This enables management of traffic congestion for even non-TCP applications such as VoIP, which do not usually respond to RED, by preventing establishment of communication sessions when congestion is being experienced.

In addition, by spotting and blocking setup messages at the beginning of a communication session, the session establishment can be blocked, thereby reducing the load on the network even from non-TCP applications.

According to one aspect of the present invention, a communication traffic congestion management apparatus includes a traffic type determination module and a traffic flow controller operatively coupled to the traffic type determination module. The traffic type determination module is adapted for determining a type of received communication traffic, and the traffic flow controller is adapted for selecting, based on the determined type and a level of communication traffic congestion, a traffic congestion management function to be applied to the received communication traffic.

The traffic type determination module may include a communication traffic processor adapted for processing the received communication traffic to determine its type.

The traffic type determination module may also include a traffic type lookup module adapted for determining whether the received communication traffic belongs to a communication traffic stream for which a type has previously been determined, and for associating the received communication traffic with the previously determined type where the received communication traffic belongs to a communication traffic stream for which a type has previously been determined. The communication traffic processor may then process the received communication traffic where the received communication traffic does not belong to a communication traffic stream for which a type has previously been determined.

The apparatus may also include a memory operatively coupled to the traffic type lookup module and to the communication traffic processor. In this case, the communication traffic processor may be adapted for storing in the memory an indication of the determined type of the received communication traffic. The traffic type lookup module may then perform the associating by accessing an indication of traffic type stored in the memory.

In some embodiments, the selecting operation involves selecting a traffic discard probability function to be used in a Random Early Discard (RED) procedure.

The traffic flow controller may be further adapted for outputting communication traffic to one or more traffic queues, and for detecting communication traffic congestion based on at least one of: an amount of communication traffic stored in the one or more traffic queues and a rate at which traffic is being delivered to the one or more queues.

According to some embodiments, the received communication traffic includes communication traffic of one or more communication traffic streams, and the traffic flow controller is further adapted for outputting communication traffic to a downstream component, for receiving one or more congestion feedback signals from the downstream component, for detecting one or more levels of communication traffic congestion based on the one or more congestion feedback signals, for determining which of the one or more communication traffic streams pertain to each congestion feedback signal, and for selecting a traffic congestion management function to be applied to a communication traffic stream based on the determined type of the received communication traffic and the congestion feedback signal to which the communication traffic stream pertains.

The traffic congestion management functions may cause the traffic flow controller to discard communication traffic types in a predetermined order as detected levels of traffic congestion increase, and cause the traffic flow controller to pass communication traffic types in a reverse order of the predetermined order as detected levels of traffic congestion decrease.

Where the received communication traffic includes blocks of communication traffic of a communication traffic stream, and the traffic flow controller may select, for each block of the communication traffic stream, a traffic congestion management function to be applied to the block.

The traffic flow controller may instead select a traffic congestion management function to be applied to all communication traffic of the communication traffic stream.

In some embodiments, the traffic congestion management function is a communication traffic stream discard function, the communication traffic stream is one of a plurality of communication traffic streams, and the traffic flow controller is further adapted for selecting a communication traffic stream for discard according to the communication traffic stream discard function using a random discard probability function.

The traffic congestion management function may involve detecting and discarding a signalled setup of a communication session.

According to another embodiment, the traffic congestion management function involves dropping all traffic of a communication traffic stream for a period of time.

A communication traffic congestion management method is also provided, and involves receiving communication traffic for transfer to a downstream communication component, determining a type of the received communication traffic, and selecting, based on the determined type of the received communication traffic and a communication traffic congestion level, a traffic congestion management function to be applied to the received communication traffic for discarding traffic so as to avoid traffic drops at the downstream communication component.

Determining may involve one or more of: processing the received communication traffic to determine its type, and determining whether the received communication traffic belongs to a communication traffic stream for which a type has previously been determined.

Where the downstream communication component includes one or more traffic queues, the method may also involve detecting traffic congestion at the downstream communication component based on at least one of: an amount of communication traffic stored in the one or more traffic queues, an average amount of traffic stored in the one or more queues over a period of time, a rate of change of the amount of traffic stored in the one or more queues, and the amount or proportion of traffic dropped from a queue of the one or more queues which has overflowed.

In some embodiments, the traffic congestion management function comprises one of a plurality of traffic congestion management functions associated with respective levels of communication traffic congestion at the downstream communication component, the method also involves detecting a level of communication traffic congestion at the downstream communication component, and selecting involves selecting the traffic congestion management function to be applied to the received communication traffic based on the determined type of the received communication traffic and the detected level of congestion.

The received communication traffic may include blocks of communication traffic of a communication traffic stream. In this case, selecting may involve selecting respective traffic congestion management functions to be applied to each block of the communication traffic stream or selecting a traffic congestion management function to be applied to all of the blocks of the communication traffic stream.

A further aspect of the invention provides a machine-readable medium storing a data structure. The data structure includes an indication of a communication traffic stream for which a communication traffic congestion level can be determined, an indication of a communication traffic type of the communication traffic stream, and an indication of a traffic congestion management function to be applied to communication traffic of the indicated type, the traffic congestion management function defining a control action to be performed on traffic of the indicated type for a determined communication traffic congestion level.

The identifier of a communication traffic stream may include a source and a destination of the communication traffic stream.

The data structure may also include one or more linking data structures comprising information associating the indication of the communication traffic type with the indication of the traffic congestion management function.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
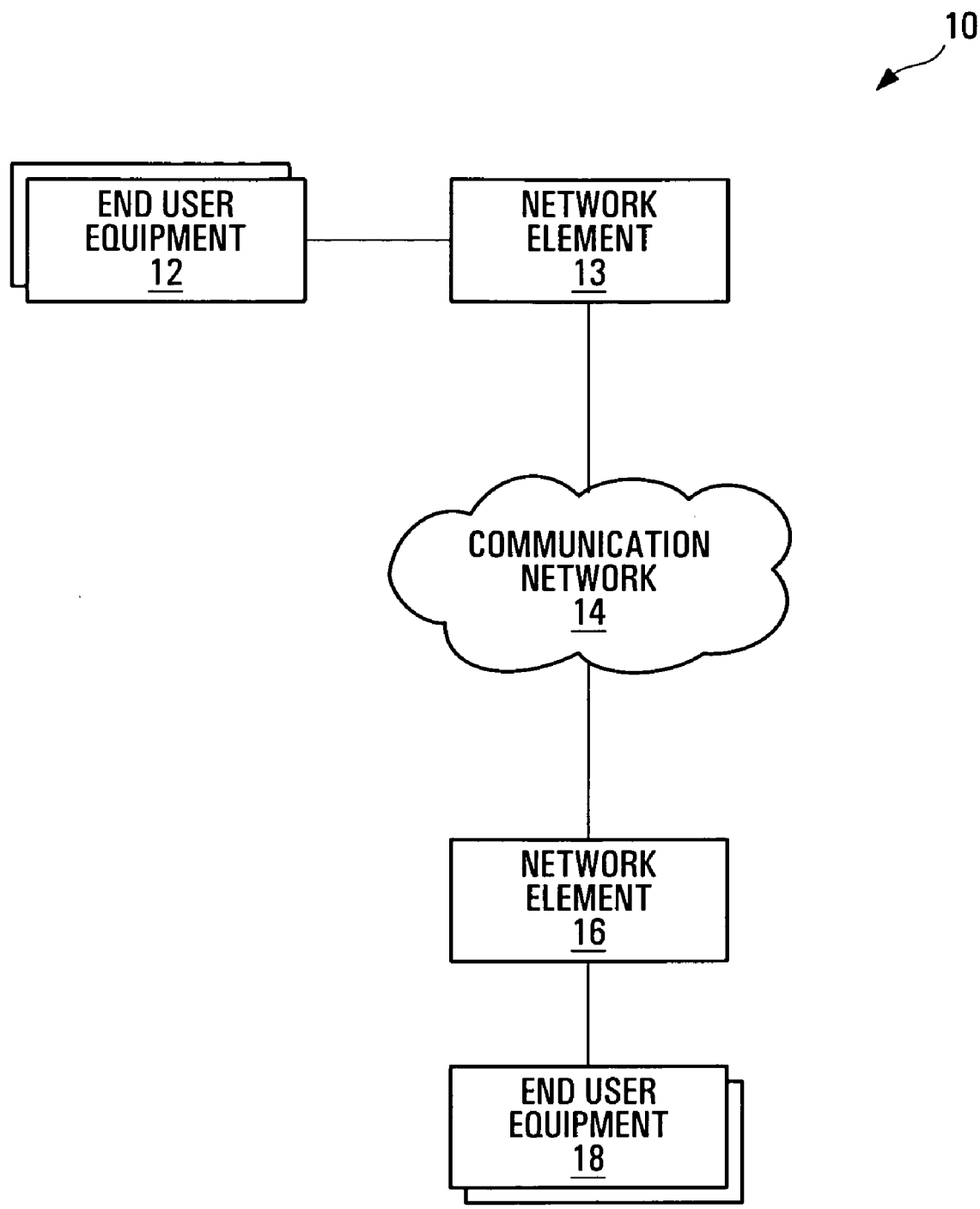
FIG. 1 is a block diagram of a communication system.

FIG. 1 is a block diagram of a communication system, and is illustrative of a system in which embodiments of the present invention might be implemented. The communication system 10 in FIG. 1 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 to avoid visual complexity. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment that is configured to generate and transmit and/or receive and terminate communication traffic. Although shown as being directly connected to the network elements 13, 16, it will be apparent that end user equipment 12, 18 may communicate with the network elements 13, 16 through other intermediate components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include core network elements which route communication traffic through the communication network 14.

Many different types of end user, intermediate, and network communication equipment, as well as the operation thereof, will be apparent to those skilled in the art. In general, communication traffic originating with the end user equipment 12, 18, and possibly other sources of communication traffic, for transfer to a remote destination through the communication network 14 is received by a network element 13, 16, translated between different protocols or formats if necessary, and routed through the communication network 14. Embodiments of the invention are not limited to any particular types of communication equipment, transfer mechanisms, or protocols.

During transfer through the communication system 10, communication traffic may become congested at any of various points. In communication equipment such as the network elements 13, 16, for example, communication traffic may become congested at traffic queues in which traffic is stored before being scheduled for transmission through communication media. As described above, current techniques for managing congestion are effective for only certain communication protocols such as TCP, and can lead to unfair or otherwise undesirable traffic discard patterns.

One embodiment of the invention combines the concept of traffic type determination, which may use application-aware DPI as described in further detail below, with type-specific traffic congestion management functions, which may use RED. In other words, when a network congestion problem threatens, communication traffic is randomly discarded, but discards are handled differently for different traffic types, depending upon an application with which the traffic is associated, for instance.

Traffic type-specific discarding, or more generally traffic type-specific congestion management, has several beneficial effects. A first benefit is that traffic that is least valuable or associated with an application for which loss of traffic, illustratively packet loss, is least important is discarded first or more heavily. Another beneficial effect is that packet discards that will degrade performance of real-time applications and/or have no positive impact on congestion control can be avoided, at least until more serious congestion conditions arise. For example, VoIP over UDP is a real-time application for which discarding of packets will not have a positive effect on congestion control, since UDP does not respond to packet loss. A further benefit is that type-specific congestion management makes it possible to discard all communication traffic of a traffic stream, instead of discarding traffic on a block-by-block basis, as might be implemented at a packet data router in a packet-based communication system, for example. This stream discard feature provides a scheme for managing congestion, even from non-TCP applications, by randomly blocking session establishment under congestion conditions.

The stream discard mode can operate in one of two fashions. In the first, the inspection discovers a session setup message associated with the stream and discards it. In the absence of a successful setup response, the initiating application will normally retry until the congestion condition passes and the setup attempt succeeds. A second fashion in which the stream based discard can operate, when rejecting a stream, involves associating a randomly selected 'isolation period' with an end point. During the isolation period, all traffic (signalling or media) associated with a particular type of traffic from that end point will be discarded. A service provider can choose to have get any given level of relief from network load by locking out more users for a shorter 'isolation period' or fewer users for a longer isolation period, for example. Selection of a particular stream for discarding may be based on a random discard probability function.

Thus, stream based discard may allow a small number of users to lose all of their traffic for a period of time, rather than many users losing traffic. This produces the maximum relief from load on the network with an impact on a minimum number of users. Stream based discard enables a local network element to respond appropriately to a congestion situation, whether or not there is a signalling controller which is capable of detecting and responding to congestion, for example by implementing a session admission control function. Furthermore, stream based discard can be applied even where a communication protocol is not understood or a signalling protocol is encrypted, by simply discarding all traffic associated with defined ports and protocols for a particular user for a period of time.

Stream based discard can be a more reliable means of dealing with congestion in the presence of signalled stream based communications than admission control. An admission control function compares an estimated current load against the theoretically available capacity to determine if a new session can start without oversubscribing some network resource. Admission control can therefore act inappropriately if the estimated load or capacity is not accurate. Congestion control is not prone to this problem, in that it does not take corrective action unless a real problem exists, and when a real problem exists, it always takes action.

Figure 2:
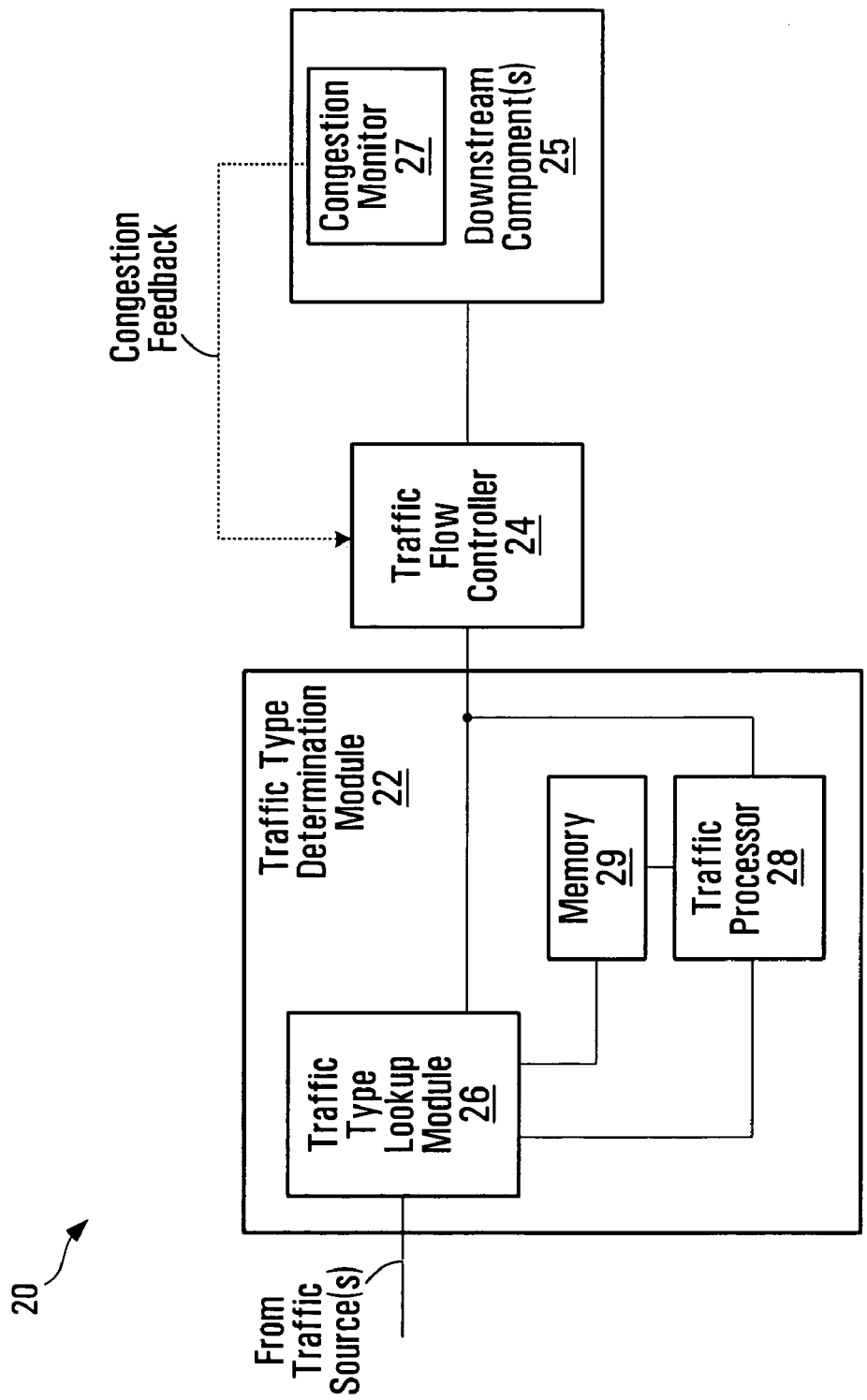
FIG. 2 is a block diagram of a communication traffic congestion management apparatus.

FIG. 2 is a block diagram of a communication traffic congestion management apparatus. The apparatus 20, which might be implemented in communication equipment such as a packet router for instance, includes a traffic type determination module 22 and a traffic flow controller 24 operatively coupled thereto. The traffic type determination module 22 has a traffic type lookup module 26, a traffic processor 28 operatively coupled to the traffic type lookup module 26, and a memory 29 operatively coupled to the traffic type lookup module 26 and to the traffic processor 28.

Communication equipment incorporating the apparatus 20 may include additional components, represented generally as downstream component(s) 25 comprising a congestion monitor 27. It should also be appreciated that the specific division of functions represented by the components 22, 24, 26, 28, 29 is intended solely for the purposes of illustration and not to limit the scope of the invention. Other embodiments of the invention may include further, fewer, or additional components interconnected in a similar or different manner. Further, multiple implementations of the components shown in FIG. 2 may be provided in communication equipment, including one implementation for control of 'upstream' traffic, and another separate implementation for control of 'downstream' traffic.

The components of the apparatus 20 may be operatively coupled to each other through physical connections such as conductive traces on a substrate where the components are provided on the same electronic circuit card and/or backplane conductors where the components are distributed between multiple cards in the same equipment. Logical interconnections are also contemplated, where any of the components of the apparatus 20 are implemented using software for execution by one or more processing elements. In this case, components may access data stored in common storage locations in the memory 29, for example, and may thus be considered to be coupled to each other through a logical connection.

From the foregoing, it should be apparent that many of the components of the apparatus 20 may be implemented using hardware, software, firmware, or any combination thereof. Those skilled in the art will be familiar with many devices which may be used in implementing the apparatus 20, including microprocessors, microcontrollers, Application Specific Integrated Circuits (ASICs), Programmable Logic Devices (PLDs), and/or Field Programmable Gate Arrays (FPGAs), for example.

In view of the many possible implementations of the components shown in FIG. 2, these components are described herein primarily in terms of their function. Based on these functional descriptions, a skilled person would be enabled to implement embodiments of the invention in any of various ways.

The memory 29, however, would generally be provided as a hardware component, and may include one or more memory devices. Solid state memory devices are common in communication equipment, although the memory 29 may also or instead include memory devices for use with movable or even removable memory media.

In operation, the traffic type determination module 22 receives communication traffic from one or more traffic sources and determines a type of the received communication traffic. Based on the determined traffic type, and an observed level of congestion feedback which maps to that traffic type as discussed below, the traffic flow controller 24 selects a traffic congestion management function to be applied to the traffic in order to reduce or prevent traffic congestion.

Communication traffic type may be determined by the traffic type lookup module 26 or by the traffic processor 28. The traffic type lookup module 26 accesses the memory 29 to determine whether the type of the received traffic had previously been identified by the traffic processor 28. A received packet, for example, may belong to a traffic stream for which a type has already been determined and stored in the memory 29. Otherwise, the traffic processor 28 processes the traffic to determine its type.

The expression 'traffic stream' as used herein may refer to a communication session between two end points, such as end user equipment 12 and 18 in FIG. 1, or communication traffic associated with such as session. A stream may be identified by source and destination IP address for instance, and also use an additional label such as IP port and protocol to distinguish different types of traffic between session end points. The phrase '5-tuple' (of IP source and destination address, source and destination port, and protocol) is one example of a stream identifier that may be used in some embodiments of the invention.

Considering an example of receiving a first packet in a traffic stream, a traffic type for that packet would not have been previously determined, and accordingly the packet is processed by the traffic processor 28. The packet may be passed to the traffic processor 28 by the traffic type lookup module 26 directly, or indirectly by storing the packet to the memory 29 for instance.

According to one relatively simple implementation, the traffic processor 28 processes the packet to detect its port number and protocol, and to determine the type of the packet, and specifically the application associated with the traffic, on the basis of the port number and protocol. However, much more sophisticated recognition approaches are also contemplated. These approaches may involve identification based on information outside the packet header (e.g., in the payload) or based on behaviour.

For example, DPI techniques may be used by the traffic processor 28 to determine the application type of an IP traffic stream by looking at a variety of information in a packet header, the payload, and/or the pattern of information exchanged over time. Recognition techniques may include any or all of the following:

a) recognition based on source and/or destination address;
b) type determination based on commonly used port numbers and protocols, as noted above;
c) digital signature matching in a packet payload;
d) state observation of a negotiated session, such as observing the port negotiated for a media path in a Session Initiation Protocol (SIP) session or passive file transfer protocol (FTP) transfer;
e) recognition based on a sequence of packet sizes exchanged;
f) recognition based on the number of streams or sessions in progress to different source/destination pairs, generally known as "fan-in" or "fan-out";
g) recognition based on stream duration; and
h) recognition based on stream setup rate and number of simultaneous streams.

Thus, the determination of traffic type in accordance with embodiments of the invention goes beyond merely identifying a priority, class of service, or other traffic handling parameters specified in communication traffic. As noted above, traffic type as disclosed herein may relate to a type of application with which traffic is associated. DPI techniques may be used by the traffic processor 28 to distinguish between web browsing, email, VoIP, gaming, peer-to-peer, and other application types, for example. This allows application-sensitive control of communication traffic by the traffic flow controller 24, as described in further detail below.

It should be appreciated that the traffic processor 28 may process additional traffic in determining the type of received communication traffic. For example, the traffic processor 28 may monitor traffic flow in both directions between parties of a communication session. Repeated request messages flowing in one direction without expected response messages flowing in the opposite direction might be indicative of a denial of service attack, for instance.

Other manners of processing traffic to determine its type may also or instead be used in some embodiments.

Figure 5:
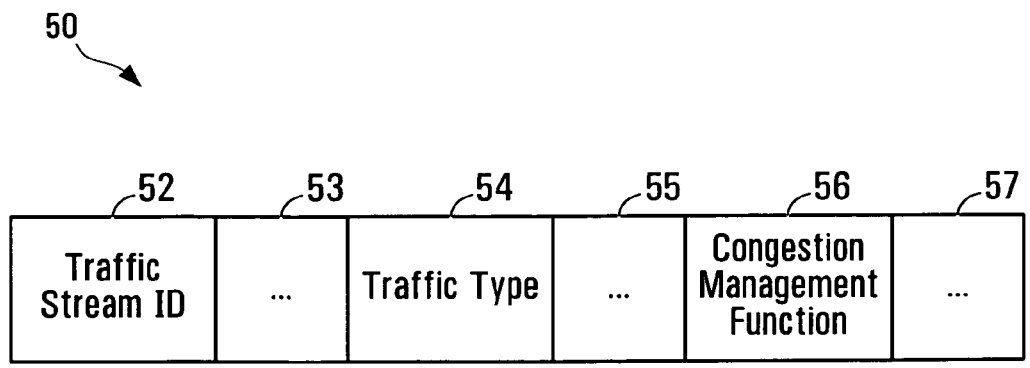
FIG. 5 is a block diagram of a communication traffic congestion management data structure.

Once the first packet in a stream is recognized, an indication of the determined type, an identifier of the stream, and possibly other information, is stored to the memory 29 by the traffic processor 28. A table or other data structure, an example of which is shown in FIG. 5 and described below, may be used to store this information. Subsequent packets of the same stream can then be identified based on header information and associated with the same previously identified type by the traffic type lookup module 26. That is, all subsequent packets, or more generally blocks, of a communication traffic stream between two end-points of the same type (i.e., having the same stream-identifying 5-tuple) may be assumed to be of the same type as determined for the first block of that stream.

The traffic flow controller 24 may be adapted to detect traffic congestion at one or more downstream component(s) 25 to which it forwards communication traffic. As shown in FIG. 2, this detection could be based on feedback signals or other control signals provided by the downstream component(s) 25, namely the congestion monitor 27 in FIG. 2. The congestion monitor 27 observes the state of congestion and feeds back congestion information to the traffic flow controller 24.

Where the traffic flow controller 24 outputs communication traffic to a traffic management (TM) system which uses queues to store communication traffic for scheduling, for example, the TM system may have a congestion monitor 27 in the form of queue depth monitoring capabilities for determining amounts of communication traffic currently stored in those queues. In this case, the traffic flow controller 24 could be connected to receive queue depth monitoring signals from the TM device. The received queue depth monitoring signals could be in the form of absolute queue depths, average queue depths, queue depth threshold signals indicating whether the queue depths are above respective thresholds, etc.

In a simple case, there is a single downstream queue for which a single indicator of actual or impending congestion is fed back to the traffic flow controller 24 by the congestion monitor 24. Where there are multiple queues in the downstream component(s) 25 however, the congestion monitor 27 may feed back many pieces of information relating to different points of network congestion, for example the average fill of a number of queues. The traffic flow controller 24 then matches the congestion feedback signal to the traffic types which are associated with the congestion, such as traffic from a defined address or set of addresses, traffic to a defined address or set of addresses, or traffic associated with a traffic type or set of traffic types. The exact nature of this mapping will depend on the structure of the queuing in the downstream component(s) 25.

In the event that hierarchical queuing, where one set of queues is aggregated into a subsequent set of queues, is implemented at the downstream component(s) 25, the congestion feedback information provided by the congestion monitor 27 may define congestion conditions for overlapping sets of traffic. Congestion conditions in this case may be both for an individual user and for a set of users which includes that individual user. The control actions implemented in the traffic flow controller 24 will be applied only to those streams which match to a scope of the congestion feedback signal, and for which the level of that feedback signal indicates that corrective action is required. In one embodiment, the traffic flow controller 24 applied traffic flow control at the most granular level at which a problem exists and control actions are possible.

The trigger for corrective action by the traffic flow controller 24 could be based on the % fill of a queue as opposed to the absolute depth. Packets dropped at queues in the downstream components 25, as a fraction of packets received for instance, can also be used as a congestion indicator provided by the congestion monitor 27 to the traffic flow controller 24. In this case, tail-drop packet loss has already started to occur at the downstream components 25.

Further, the trigger for corrective action could in general be any arbitrary function of the queue depth as opposed to the average. For example, if the queue depth is referred to as D, the trigger function T for corrective action could be $$T = f_1(D) + f_2 \frac{d}{dt}D + f_3 \int D dt.$$

In simple terms, this Trigger T is based on the current depth of the queue $f_1$, the rate of change of queue depth at this instant in time $f_2$, and the average depth of the queue over some time period $f_3$.

In some embodiments, received queue depth information is further processed by the traffic flow controller 24 to generate congestion information in a different format that is compatible with its supported traffic congestion management functions. For example, a downstream TM device may provide absolute queue depths to the traffic flow controller 24, and the traffic flow controller may then calculate average queue depths for use in determining whether it should pass or discard communication traffic. Congestion thresholds used by the traffic flow controller 24 and the downstream component(s) thus need not necessarily be the same. The traffic flow controller 24 may use more, fewer, and/or different congestion thresholds than the downstream component(s) 25. The congestion thresholds used by the traffic flow controller 24 may also or instead be defined in a similar or different manner than those of the downstream component(s).

It should be appreciated that the characterization of communication components as downstream or upstream communication components is dependent upon a direction of communication traffic transfer. A downstream component from the perspective of traffic flow from left to right through the apparatus 20 might be considered an upstream component for communication traffic flowing in the opposite direction, through another data path of communication equipment in which the apparatus 20 is implemented. Thus, references to downstream and upstream communication components are intended for convenience only, and do not imply that embodiments of the invention may be used in conjunction with communication equipment which is capable of only unidirectional communication traffic transfer.

The traffic flow controller 24 selects a traffic congestion management function to be applied to the communication traffic, based on at least the determined type of the communication traffic and generally the source and destination of the traffic as well. The congestion management function specifies a level of randomly selected discard that should apply to traffic given an observed level of congestion feedback which applies to that traffic. As noted above, the type of received communication traffic is determined by the traffic type determination module 22, and in particular by either the traffic type lookup module 26 or the traffic processor 28. Any of several mechanisms may be provided to inform the traffic flow controller 24 of the determined traffic type.

For example, the traffic type lookup module 26 or the traffic processor 28 may insert an indication of the determined traffic type into the communication traffic, such as in a new or existing header field. In one embodiment, this indication is inserted into the DSCP field. The traffic flow controller 24 may instead access the memory 29 to determine the type of the packet. This would effectively incorporate at least some of the functions of the traffic type lookup module 26 into the traffic flow controller 24. The traffic type lookup module 26 might still determine whether the traffic processor 28 should process received communication traffic to determine its type, although it need not in this embodiment insert traffic type indicators into the communication traffic.

The traffic type determination module 22 and the traffic flow controller 24 may use different traffic type-specific information in performing their functions. Whereas the traffic type determination module 22 may determine the application type for received communication traffic for instance, the traffic flow controller 24 could use a discard preference associated with the application type, instead of the actual application type itself, in determining how the flow of communication traffic is to be controlled.

Consider an example in which communication traffic types are associated with discard preferences in another table or data structure in the memory 29. Once the traffic type of a packet in a stream is identified, then an indication of the discard preference could be inserted into the packet before it is transferred to the traffic flow controller 24, or the traffic flow controller 24 could access a stream to type mapping table and the type to discard preference mapping table. Subsequent packets of the same stream may be assigned the same type and thus discard preference. The traffic flow controller 24 may use a discard probability function, selected on the basis of the discard preference, to determine whether each packet is to be passed or discarded. As described in further detail below, the actual discard probability in response to a particular discard preference changes with queue depth, or more generally, the level of detected congestion.

Another possible implementation of discard preferences involves congestion-sensitive discard preferences, in which the discard preference of a particular traffic type changes with congestion conditions. As the level of congestion increases and queue depths grow, more traffic is assigned discard preferences that have a higher likelihood of being discarded. Either or both of the discard preferences and/or the discard probability functions used by the traffic flow controller 24 could be type-specific in this case.

The pass/discard functionality of the traffic flow controller 24 is governed by a RED procedure in one embodiment. Standard or weighted RED, for example, may be used on a per-type basis. FIGS. 3A through 3F illustrate example traffic discard probability functions that could be used in conjunction with a RED procedure. It should be appreciated that the examples shown in FIGS. 3A through 3F are intended to be illustrative, and by no means exhaustive. Other discard probability functions, other forms of traffic congestion management functions, and other discard procedures than RED may be used in different embodiments of the invention.

Figure 3A:
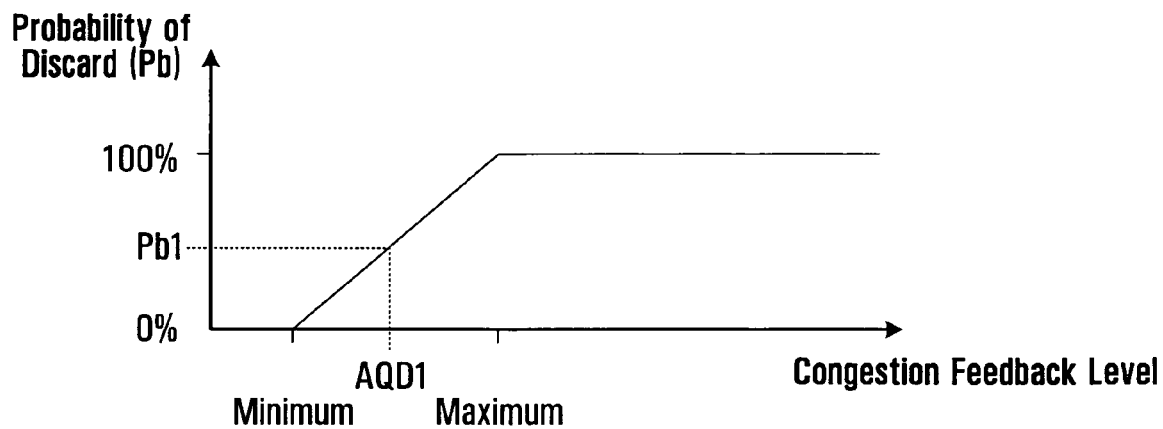
FIGS. 3A through 3F illustrate example traffic discard probability functions.

According to the discard probability function of FIG. 3A, the discard probability is zero until a minimum congestion threshold indicated by congestion feedback signals is reached, and thereafter the discard probability increases linearly until a maximum threshold is reached. For congestion feedback signals greater than the maximum threshold, the discard probability is 100%. A discard probability function of this type has been described briefly above. In accordance with an aspect of the invention, a different discard probability function is selected by the traffic flow controller 24 (FIG. 2) for each different traffic type. The same discard probability function could instead be used in conjunction with different traffic type-specific discard preferences and/or discard procedures to achieve type-specific congestion management by providing type-specific traffic flow control.

Figure 3B:
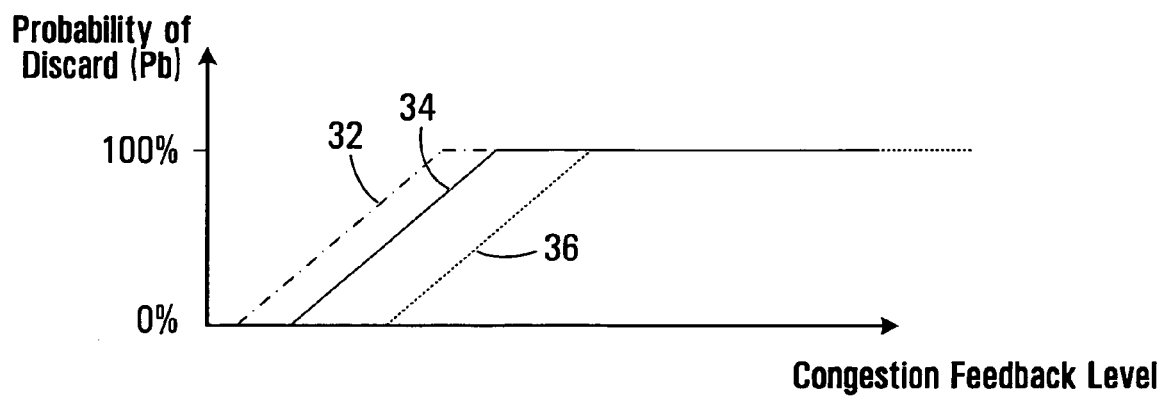

FIG. 3B shows discard probability functions for a type-specific version of weighted RED in accordance with another embodiment of the invention. Unlike conventional weighted RED, the traffic controller 24 (FIG. 2) selects one of the three discard probability functions 32, 34, 36 for communication traffic based on its type. The discard probability functions 32, 34, 36 are associated with respective minimum and maximum congestion levels, and result in different discard probabilities for different traffic types at the same congestion level.

The probability functions 32, 34, 36 could be defined and assigned to traffic types such that traffic of the various types is discarded in a particular order. For example, when traffic congestion first occurs, packets might be discarded from email applications, then web browsing if congestion continues to increase beyond another threshold, as determined by the weighted RED discard probability function for that type of application. Email and web browsing applications might be associated with the functions 32, 34 in this example. If traffic congestion continues to increase, then the traffic flow controller 24 (FIG. 2) might begin discarding packets from gaming applications, then peer-to-peer applications, and finally VoIP applications. As traffic congestion decreases and average queue depths fall, this order is reversed, such that the last application types from which packets are discarded will be the first to have their traffic bandwidth restored to normal levels.

Mappings between traffic types and traffic congestion management functions such as discard probability functions may be specified, for example, in one or more tables or other data structures stored in a memory. According to one embodiment, a stream table maps communication traffic streams to their determined traffic types, another table maps traffic types to discard preferences, and a third table maps discard preferences to discard probability functions.

Figure 3C:
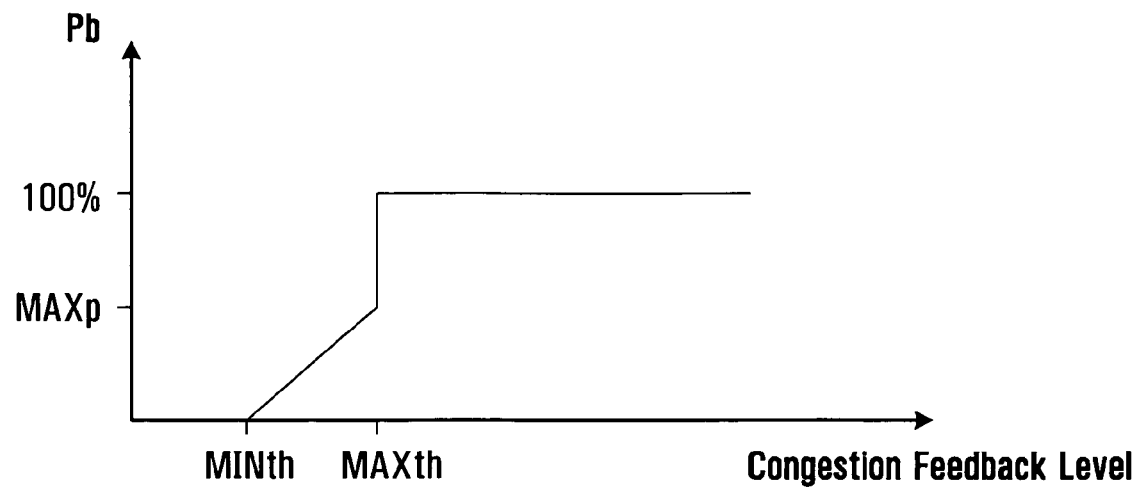

FIGS. 3A and 3B show discard probability functions having one profile or shape. FIG. 3C shows a discard probability function having another shape that is generally accepted to work well. Different values for MAXp, the minimum threshold MINth, and the maximum threshold MAXth may be used to achieve different discard patterns.

Figure 3D:
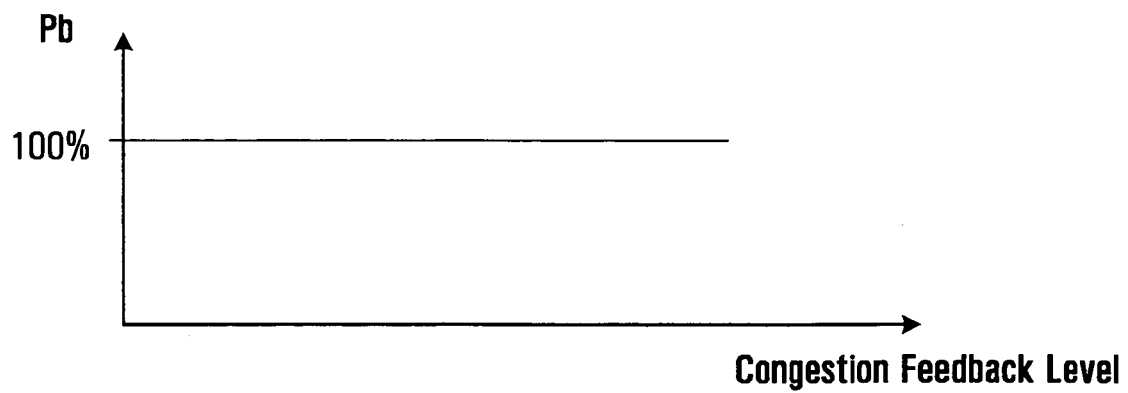

Another possible discard probability function is shown in FIG. 3D. This type of function could be used when communication traffic is determined to be a security threat, from a worm or virus for instance. According to the function of FIG. 3D, all communication traffic of a stream is dropped, regardless of congestion. This illustrates that embodiments of the invention may use congestion-responsive functions such as those as shown in FIGS. 3A through 3C and/or functions that are not themselves sensitive to congestion but useful in preventing congestion.

Figure 3E:
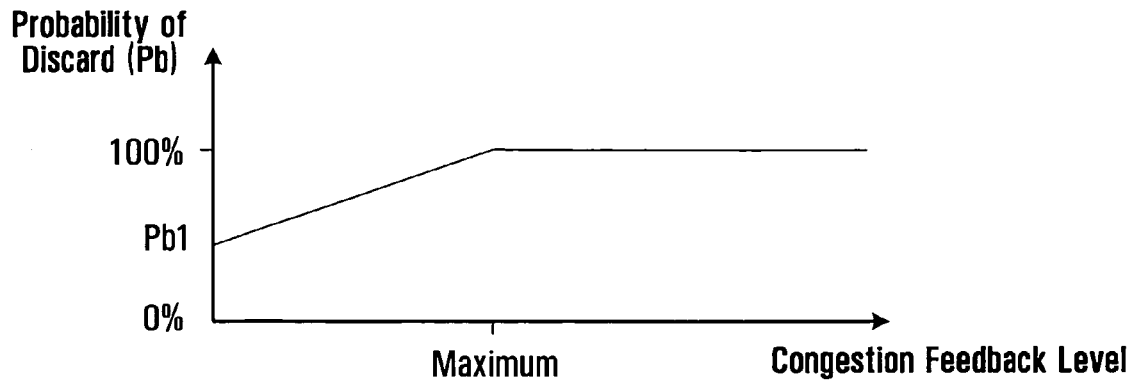

With reference to FIG. 3E, this function may be useful for such applications as peer-to-peer, which can place a significant load on network resources and are relatively insensitive to network performance. Using the function of FIG. 3E, discard probability may be non-zero even when queue depth is near zero, as shown.

Figure 3F:
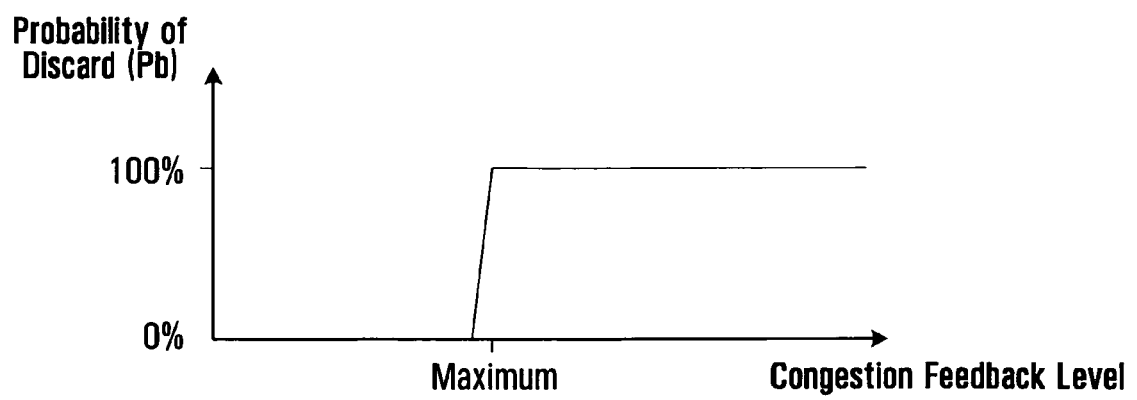

Yet another application type such as VoIP might be set to discard communication traffic only under extreme congestion conditions, using a function such as shown in FIG. 3F.

Although shown as plots in FIGS. 3A through 3F, it will be appreciated by those skilled in the art that discard probability functions may be defined by information stored in a memory. In the apparatus 20 (FIG. 2), for example, probability tables defining various discard probability functions could be stored in the memory 29 or another memory for access by the traffic flow controller 24.

As described above, the determination of whether to discard or pass a packet according to RED is made by comparing the discard probability of the packet to a random number. There are two common methods for selecting and comparing a random number, or random variable, to the discard probability. These methods are the Geometric Random Variable (GRV) method and the Uniform Random Variable (URV) method, either of which could be used in embodiments of the invention. Random variable comparison method is another facet of a congestion control function that could be selected based on traffic type. The GRV method could be applied to some traffic types, whereas the URV method is used for other traffic types.

According to the GRV method, a new random number is selected for each packet arriving at a queue. If the discard probability for the packet exceeds the random number, then the packet is discarded. The resulting discards are randomly distributed in time. However, according to the URV method, the resulting packet discards are distributed evenly in time, which can be more desirable. The URV method selects a new random number only after a packet has been discarded. The number of packets (count) since the last discard is tracked and multiplied by the discard probability. If the product is greater than the random number, then the packet is discarded, the count is set to zero, and a new random number is generated. Otherwise the packet is passed and the count is incremented.

Other variations of the techniques described herein are possible. The numbers and shapes of discard probability functions and/or the manner in which these functions are used may vary between embodiments of the invention. Further embodiments of the invention may also use other types of traffic congestion management function than discard probability functions.

The type-sensitive traffic flow control approach to traffic congestion management offers another key opportunity, which is the ability to drop entire communication traffic streams rather then just packets or other blocks of communication traffic. A "stream RED" embodiment of the invention could perform a discard probability to random number comparison for the first packet in a stream and apply the resultant decision (pass versus discard) to all subsequent packets in the same stream, thereby effectively applying the same traffic congestion management function to an entire communication traffic stream.

Stream based traffic flow control may be useful even for non-TCP traffic such as VoIP over SIP, because an entire SIP session can be rejected and all packets associated with it dropped. This produces a beneficial gain in relief from congestion without actually permanently denying service to any customer. As such, it offers a practical alternative to other mechanisms which might be used to maintain Quality of Service (QoS) on a VoIP or streaming media network. For example, while it might be possible to also avoid oversubscription to a VoIP network by reserving bandwidth or using a centralized policy broker to admit new sessions, a stream based traffic flow control mechanism could be configured to block sessions only when congestion occurs, and only to the minimum extent required to control congestion. This is not true of the other QoS assurance mechanisms, which either waste bandwidth by reserving it even when not in use, or by providing admission control to a predefined bandwidth threshold, even if the network is under-utilised, thereby resulting in lost revenue. Since it is simple, automated, and produces the minimum possible blocking effect, such stream based traffic flow control may provide a feasible alternative to, or at least complement, other QoS assurance approaches.

Figure 4:
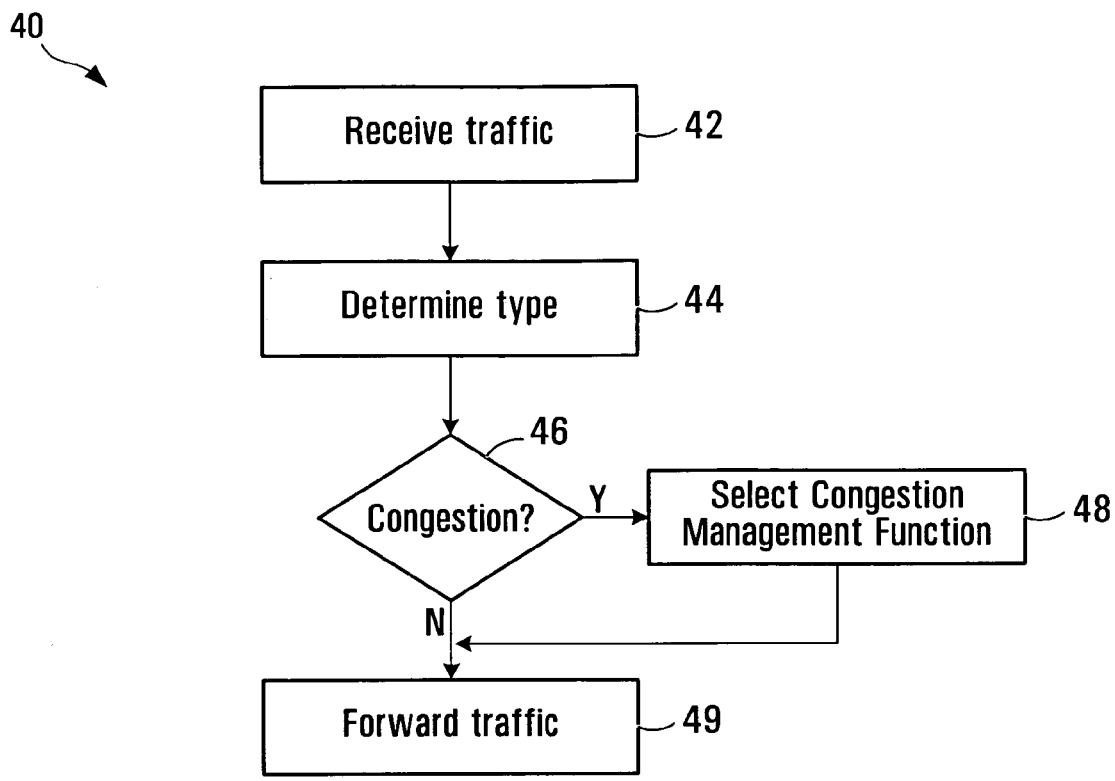
FIG. 4 is a flow diagram showing a communication traffic congestion management method.

Although described above primarily in the context of an apparatus, other implementations of the techniques disclosed herein are also contemplated. FIG. 4, for example, illustrates a method according to an embodiment of the invention.

The congestion management method 40 begins at 42 when communication traffic is received for transfer to a downstream communication component. At 44, a type of the received communication traffic is determined. If congestion is detected at 46, a traffic congestion management function to be applied to the received communication traffic is selected at 48 based on the traffic type. At 49, the received communication traffic, or any portion of the traffic which is not discarded at 48, is forwarded to the downstream communication component.

Other embodiments of the invention may include further, fewer, or different operations than those explicitly shown in FIG. 4, performed in a similar or different order. For instance, as noted above and shown in FIGS. 3D and 3E, a traffic congestion management function need not necessarily be responsive to actual detected congestion. Thus, the operation at 46 may involve determining that congestion is being experienced at the downstream communication component, or possibly that a congestion condition is imminent and/or should be avoided. In terms of ordering, the traffic type determination and/or the traffic congestion management function selection may be made before or after the congestion determination. Where traffic is discarded only when congestion is observed, then the operations at 44 and 48 may both follow the congestion determination at 46.

Various manners of performing the operations shown in FIG. 4 and further variations of the method 40 are contemplated, some of which have been described above with reference to FIGS. 2 and 3A through 3F.

FIG. 5 is a block diagram of a communication traffic congestion management data structure, which may be used in some embodiments of the invention. Data structures having fewer, further, or different data fields than those explicitly labelled in FIG. 5 are also contemplated, as described in further detail below.

The data structure 50 would be stored in a machine-readable medium such as the memory 29 (FIG. 2) to map traffic types to congestion management functions. In the example shown, the data structure 50 includes an indication 54 of a communication traffic type and an indication 56 of a congestion management function to be applied to communication traffic of the type indicated at 54 for managing traffic congestion. A mapping table might include respective records having this format for each traffic type handled by a traffic flow controller, for instance.

The example data structure 50 also has an identifier 52 of a communication traffic stream that includes communication traffic of the type indicated at 54. The traffic stream is thus associated with the communication traffic type indicated at 54, and also the congestion management function indicated at

56. Data records including respective identifiers of different traffic streams and their corresponding traffic types and/or congestion management functions might be stored in a traffic stream table for access by a traffic flow controller.

As described above, in some embodiments a stream of traffic between two end points has a unique label defined by an IP 5-tuple, which is an example of the traffic stream identifier 52. Every traffic stream identifier is associated with one and only one traffic type. A single traffic type, however, may have none or many traffic stream identifiers associated with it at any point in time.

Traffic type identification has also been described in detail above. An identification pattern may be used to characterize a traffic type, with each traffic type having at least one and possibly multiple identification patterns. Patterns may include traffic content patterns or behavioural patterns. Once a traffic type has been determined for a traffic stream, the stream can be associated with the type in a record stored in a memory, as shown at 52, 54.

A congestion feedback signal may be used to select a congestion management function for a traffic stream based on one or more source addresses, one or more destination addresses, and/or one or more traffic types. Every traffic stream identifier is generally associated with at most one congestion feedback signal. This association may be explicitly specified in the data structure 50 by including a feedback signal identifier in one of the additional fields 53, 55, 57, or an implicit or indirect association. In the latter case, the traffic type 54 may provide an indirect association in that the traffic stream identifier 52 and a congestion feedback signal may be associated with the same traffic type but not directly and explicitly associated with each other.

A congestion management function may be selected for a traffic stream based on two criteria, including a congestion feedback signal and information in one or more of the traffic type and traffic stream identifier fields 52, 54. Every combination of traffic type/stream identifier and congestion feedback level has one and only one resultant congestion management function. However, the same congestion management function may apply to many different combinations of traffic type/stream identifier and congestion feedback level. When a congestion management function for a traffic stream at a current congestion level has been selected, an indication of that selected function is stored in the field 56 and subsequently accessed by a traffic flow controller to determine which specific traffic control function is to be applied to a stream.

A data structure used in embodiments of the invention may also include other information. This is represented in FIG. 5 at 53, 55, 57. Although the traffic stream identifier 52 is shown as the first data field in the data structure 50, other embodiments may use data structures that include information preceding a traffic stream identifier. Also, a data structure need not necessarily include all of the data fields shown in FIG. 5, and/or may include data fields arranged in a different order than shown.

Another possible data structure variation would be to provide linking data structures to build associations between traffic types or traffic streams and corresponding congestion management functions. For example, traffic streams could be mapped to application types in one mapping table, application types could be mapped to discard preferences in another mapping table, and discard preferences could be mapped to congestion management functions in a further mapping table. Similarly, where different discard preferences are assigned to the same traffic type depending on current congestion levels, discard preference mappings may include a congestion level mapping component.

Further variations of the data structure 50, some of which may be or become apparent to those skilled in the art, may be made without departing from the present invention.

Embodiments of the invention may be used to reduce the impact of discarding communication traffic. Traffic types for which loss of traffic is least important are discarded first. Degradation in performance of real-time applications such as VoIP can also be avoided where traffic associated with these applications can be discarded last, only under highly congested conditions. Similarly, traffic congestion management functions can be selected so that discarding of traffic that that has no positive impact on congestion control, such as UDP packets, is avoided.

In some embodiments, stream based traffic discarding is supported. This enables control over communication network load from even non-TCP applications, in a fashion which protects the quality of those applications, and only applies control when congestion requires corrective action.

The techniques disclosed herein would allow communication service providers to respond to traffic congestion in a manner that accounts for the sensitivity of various traffic types/applications to traffic loss. Service providers are then able to guarantee better quality of service to their customers and to run their networks at higher capacity.

What has been described is merely illustrative of the application of principles of embodiments of the invention. Other arrangements and methods can be implemented by those skilled in the art without departing from the scope of the present invention.

It should be appreciated that implementation of an embodiment of the invention would not necessarily preclude other functions. For example, a traffic flow controller could be implemented in conjunction with a traffic management device that also uses backpressuring, session admission control, or other schemes when communication traffic becomes congested.

In a similar manner, various components which perform the congestion management functions disclosed herein may also perform additional functions. A traffic processor that determines the type of received communication traffic could be provided as software for execution by a processing element which also performs other tasks, for instance.

In addition, although described primarily in the context of methods and systems, other implementations of the invention are also contemplated, as instructions stored on a machine-readable medium, for example.

I claim:

1. A communication traffic congestion management apparatus comprising:
    a traffic type determination module adapted for determining a type of application associated with received communication traffic; and
    a traffic flow controller, operatively coupled to the traffic type determination module, adapted for selecting, based on the determined type of application and a level of communication traffic congestion, a traffic congestion management function to be applied to the received communication traffic,
    wherein the traffic type determination module comprises a communication traffic processor adapted for processing the received communication traffic to determine its type of associated application,
    wherein the traffic type determination module further comprises a traffic application type lookup module adapted for determining whether the received communication traffic belongs to a communication traffic stream for which a type of associated application has previously been determined, and for associating the received communication traffic with the previously determined type of associated application where the received communication traffic belongs to a communication traffic stream for which a type of associated application has previously been determined, and wherein the communication traffic processor processes the received communication traffic where the received communication traffic does not belong to a communication traffic stream for which a type of associated application has previously been determined.

2. The apparatus of claim 1, further comprising:

a memory operatively coupled to the traffic type lookup module and to the communication traffic processor, wherein the communication traffic processor is adapted for storing in the memory an indication of the determined type of application associated with the received communication traffic, and wherein the traffic type lookup module is adapted for performing the associating by accessing an indication of traffic application type stored in the memory.

3. The apparatus of claim 1, wherein selecting comprises selecting a traffic discard probability function to be used in a Random Early Discard (RED) procedure.

4. The apparatus of claim 1, wherein the traffic flow controller is further adapted for outputting communication traffic to one or more traffic queues, and for detecting communication traffic congestion based on at least one of: an amount of communication traffic stored in the one or more traffic queues and a rate at which traffic is being delivered to the one or more queues.

5. The apparatus of claim 1, wherein the received communication traffic comprises communication traffic of one or more communication traffic streams, and wherein the traffic flow controller is further adapted for outputting communication traffic to a downstream component, for receiving one or more congestion feedback signals from the downstream component, for detecting one or more levels of communication traffic congestion based on the one or more congestion feedback signals, for determining which of the one or more communication traffic streams pertain to each congestion feedback signal, and for selecting a traffic congestion management function to be applied to a communication traffic stream based on the determined type of application associated with the received communication traffic and the congestion feedback signal to which the communication traffic stream pertains.

6. A communication traffic congestion management apparatus comprising:

a traffic type determination module adapted for determining a type of application associated with received communication traffic; and a traffic flow controller, operatively coupled to the traffic type determination module, adapted for selecting, based on the determined type of application and a level of communication traffic congestion, a traffic congestion management function to be applied to the received communication traffic, wherein the received communication traffic comprises communication traffic of one or more communication traffic streams, wherein the traffic flow controller is further adapted for outputting communication traffic to a downstream component, for receiving one or more congestion feedback signals from the downstream component, for detecting one or more levels of communication traffic congestion based on the one or more congestion feedback signals, for determining which of the one or more communication traffic streams pertain to each congestion feedback signal, and for selecting a traffic congestion management function to be applied to a communication traffic stream based on the determined type of application associated with the received communication traffic and the congestion feedback signal to which the communication traffic stream pertains, and wherein the selected traffic congestion management function comprises one of a plurality of traffic congestion management functions that cause the traffic flow controller to discard communication traffic having associated application types in a predetermined order as detected levels of traffic congestion increase, and cause the traffic flow controller to pass communication traffic having associated application types in a reverse order of the predetermined order as detected levels of traffic congestion decrease.

7. The apparatus of claim 1, wherein the received communication traffic comprises blocks of communication traffic of a communication traffic stream, and wherein the traffic flow controller is adapted for selecting, for each block of the communication traffic stream, a traffic congestion management function to be applied to the block.

8. The apparatus of claim 1, wherein the received communication traffic comprises communication traffic of a communication traffic stream, and wherein the traffic flow controller is adapted for selecting a traffic congestion management function to be applied to all communication traffic of the communication traffic stream.

9. The apparatus of claim 8, wherein the traffic congestion management function comprises a communication traffic stream discard function, wherein the communication traffic stream comprises one of a plurality of communication traffic streams, and wherein the traffic flow controller is further adapted for selecting a communication traffic stream for discard according to the communication traffic stream discard function using a random discard probability function.

10. The apparatus of claim 8, wherein the traffic congestion management function comprises detecting and discarding a signaled setup of a communication session.

11. The apparatus of claim 8, wherein the traffic congestion management function comprises dropping all traffic of the communication traffic stream for a period of time.

12. A communication traffic congestion management method comprising:

receiving communication traffic for transfer to a downstream communication component;

determining a type of application associated with the received communication traffic; and selecting, based on the determined type of application associated with the received communication traffic and a communication traffic congestion level, a traffic congestion management function to be applied to the received communication traffic for discarding traffic so as to avoid traffic drops at the downstream communication component, wherein the traffic congestion management function comprises one of a plurality of traffic congestion management functions associated with respective levels of communication traffic congestion at the downstream communication component,
wherein the method further comprises detecting a level of communication traffic congestion at the downstream communication component, and
wherein selecting comprises selecting the traffic congestion management function to be applied to the received communication traffic based on the determined type of application associated with the received communication traffic and the detected level of congestion.

13. The method of claim 12, wherein determining comprises one or more of: processing the received communication traffic to determine its type of associated application, and determining whether the received communication traffic belongs to a communication traffic stream for which a type of associated application has previously been determined.

14. The method of claim 12, wherein the downstream communication component comprises one or more traffic queues, and wherein detecting comprises:
detecting traffic congestion at the downstream communication component based on at least one of: an amount of communication traffic stored in the one or more traffic queues, an average amount of traffic stored in the one or more queues over a period of time, a rate of change of the amount of traffic stored in the one or more queues, and the amount or proportion of traffic dropped from a queue of the one or more queues which has overflowed.

15. The method of claim 12, wherein the traffic congestion management functions cause discarding of communication traffic having associated application types in a predetermined order as detected levels of traffic congestion increase, and cause passing of communication traffic having associated application types in a reverse order of the predetermined order as detected levels of traffic congestion decrease.

16. The method of claim 12, wherein the received communication traffic comprises blocks of communication traffic of a communication traffic stream, and wherein selecting comprises selecting respective traffic congestion management functions to be applied to each block of the communication traffic stream or selecting a traffic congestion management function to be applied to all of the blocks of the communication traffic stream.

* * * * *